United States Patent [19]

Warner et al.

[11] Patent Number: 4,516,984
[45] Date of Patent: May 14, 1985

[54] DEGASSING PROCESS AND APPARATUS FOR REMOVAL OF OXYGEN

[75] Inventors: Isiah M. Warner, Stone Mountain, Ga.; Chu-Ngi Ho, Johnson City, Tenn.

[73] Assignee: Emory University, Atlanta, Ga.

[21] Appl. No.: 549,737

[22] Filed: Nov. 8, 1983

[51] Int. Cl.³ ............................................. B01D 53/22
[52] U.S. Cl. .......................................... 55/16; 55/158; 55/189; 423/219
[58] Field of Search ....................... 55/16, 36, 37, 158, 55/159, 189, 270; 423/219

[56] References Cited

U.S. PATENT DOCUMENTS

| | | | |
|---|---|---|---|
| 2,170,596 | 8/1939 | Quiggle | 423/219 |
| 3,198,335 | 8/1965 | Lewis et al. | 55/158 X |
| 3,371,468 | 3/1968 | Shropshire | 55/158 |
| 3,447,286 | 6/1969 | Dounoucos | 55/158 X |
| 3,526,578 | 9/1970 | Silverman | 55/159 X |
| 3,614,856 | 10/1971 | Sanz et al. | 55/158 X |
| 3,735,562 | 5/1973 | Mousseau, Jr. et al. | 55/158 |
| 3,751,879 | 8/1973 | Allington | 55/158 |
| 3,849,539 | 11/1974 | Coleman | 423/219 |
| 3,856,475 | 12/1974 | Marx | 55/159 X |
| 3,911,080 | 10/1975 | Mehl et al. | 55/158 X |
| 3,957,504 | 5/1976 | Ho et al. | 55/158 X |
| 4,132,766 | 1/1979 | Erickson | 423/219 X |
| 4,208,194 | 6/1980 | Nelson | 55/158 |
| 4,257,257 | 3/1981 | Dairaku et al. | 55/158 X |
| 4,343,715 | 8/1982 | Bonaventura et al. | 423/219 X |
| 4,366,700 | 1/1983 | Bouck | 55/158 X |

FOREIGN PATENT DOCUMENTS 98731  1/1984  European Pat. Off. ............ 423/219

Primary Examiner—Robert Spitzer
Attorney, Agent, or Firm—Oblon, Fisher, Spivak, McClelland & Maier

[57] ABSTRACT

A method for decreasing the oxygen content of a fluid, which comprises contacting the fluid with one side of an interface capable of passing oxygen and retarding the passage of the fluid wherein the contacting takes place in a container permeable to oxygen only through the interface and the second side of the interface is in contact with a chemically deoxygenating environment, is disclosed along with an apparatus useful for conducting the method.

23 Claims, 5 Drawing Figures

SCHEMATIC OF ENHANCED FLUOROMETRIC ANALYSIS OF PNAs USING OXYGEN DEGASSER

4,516,984

DEGASSING PROCESS AND APPARATUS FOR REMOVAL OF OXYGEN

BACKGROUND OF THE INVENTION

1. Field of the Invention

The present invention is related to processes involving the removal of oxygen from fluid streams and to apparatuses used for this purpose.

2. Description of the Prior Art

Selective removal of a gas from a fluid stream is a common problem in many areas of chemistry. Examples include separating aliphatically-unsaturated hydrocarbons from mixtures containing the same (e.g. in the preparation of ethylene), recovering helium from natural gas, separating hydrogen from a petroleum cracking product, and the like. Among the methods developed for gas separation are those involving transport of gases through a membrane that retards the passage of some or all of the remaining fluid components. Examples of these processes can be found in the following U.S. Patents: recovery of helium from natural gas, U.S. Pat. No. 3,246,449; recovery of hydrogen from cracked petroleum, U.S. Pat. No. 3,246,450; removal of gas bubbles from analyte streams, U.S. Pat. No. 3,463,615; removing carbon dioxide from blood, U.S. Pat. No. 3,651,616; removing gases from liquid streams, U.S. Pat. No. 3,751,879; and separating olefins from other hydrocarbons, U.S. Pat. No. 4,239,506. Various apparatuses for carrying out these separations are disclosed in these patents and in U.S. Pat. No. 4,336,138, which discloses a permeation separation apparatus.

Typical of these disclosures is U.S. Pat. No. 3,751,879 which indicates that gases which pass through the membrane are removed by a vacuum pump, by venting to the atmosphere, by collection in an evacuated and sealed chamber, or by physical absorption or adsorption. Thus two general methods of gas removal have taken place in the prior arr: first, removal of gas from the vicinity of the membrane either by a vacuum pump or by passive diffusion into the atmosphere, and second, collection of the gas near the membrane in a vacuum chamber or physical absorbant. Both these methods suffer from disadvantages when applied to oxygen removal from fluid streams, the first requiring an expensive vacuum pump (since passive diffusion into oxygen-containing air is clearly inappropriate) and the second having a limited capacity and being difficult to monitor for loss of absorbing ability.

One area in which oxygen removal from fluid streams is very important is the field of automated luminescence measurement of analytes. Many organic compounds fluoresce or phosphoresce, and these properties are widely used for analysis. Molecules are generally excited by the absorption of ultraviolet radiation to a higher electronic state to produce measurable luminescent emission. Excited molecules rapidly lose excess energy by a variety of nonradiative de-excitation steps to the lowest excited singlet or triplet state, at which point the molecule can return to the ground state by emission of a photon. Various nonradiative de-excitation processes compete with and often greatly reduce the measurable luminescence. Of these processes, quenching has the most pronounced effects. Quenching is defined as any proces that results in a decrease in the true fluorescence or phosphorescence efficiency of a molecule. Quenching processes divert the absorbed energy of a molecule into channels other than fluorescence or phosphorescence.

The presence of molecular oxygen contributes significantly to quenching because most organic molecules in an excited state will nonradiatively deactivate after one or two collisions with molecular oxygen. Quenching is often a serious problem for phosphorescence since the longer lifetimes of the excited state allow more opportunities for collisions to occur. The effect of oxygen quenching on fluorescence is pronounced for solutions of many polynuclear aromatic compounds, but the fluorescence of virtually all organic compounds is quenched, at least slightly, by oxygen. Thus, the presence of oxygen decreases the luminescence efficiency of a sample.

Several methods of deoxygenation are currently used for preparation of fluorescent samples. These methods include nitrogen purging, freeze-thaw techniques, and preparations of samples within a vacuum. However, these methods have varying degrees of effectiveness. Furthermore, they are time-consuming and rather tedious. Thus, sample deoxygenation is usually not carried out for routine fluorometric testing despite the obvious advantages relating to fluorescence efficiency which could be obtained by deoxygenarion. Accordingly, a routine and easily carried out process for the removal of oxygen from a sample being measured in a fluorescence or phosphorescence spectrophotometer is greatly needed as is a method for removing oxygen from fluid streams in general.

SUMMARY OF THE INVENTION

Accordingly, it is an object of the present invention to provide a process for removing oxygen from a fluid stream.

It is a further object of this invention to provide an apparatus for carrying out the process described herein.

These and other objects of the invention as will hereinafter become more readily apparent have been accomplished by providing a method for decreasing the oxygen content of a fluid stream, which comprises contacting said fluid with one side of an interface capable of passing oxygen and retarding the passage of said fluid wherein the second side of said interface is in contact with a chemically deoxygenating environment and said contacting takes place in a container permeable to oxygen only through said interface.

The invention further comprises an apparatus capable of decreasing the oxygen content of a fluid stream. The apparatus includes an interface capable of passing oxygen and retarding the passage of said fluid; a first container for maintaining the fluid in contact with a side of the interface, the first container being impermeable to gas except through the interface and having an inlet and outlet through which the fluid is conducted into and out of the first container; and a second container for maintaining a deoxygenating environment in contact with the second side of the interface.

BRIEF DESCRIPTION OF THE DRAWINGS

A more complete appreciation of the invention and many of the attendant advantages thereof will be readily obtained as the invention becomes better understood by reference to the following detailed description when considered in connection with the accompanying drawings, wherein:

FIG. 1b shows a perspective drawing of an actual apparatus of the type shown schematically in FIG. 1a;

DESCRIPTION OF THE PREFERRED EMBODIMENTS

Figure 1A:
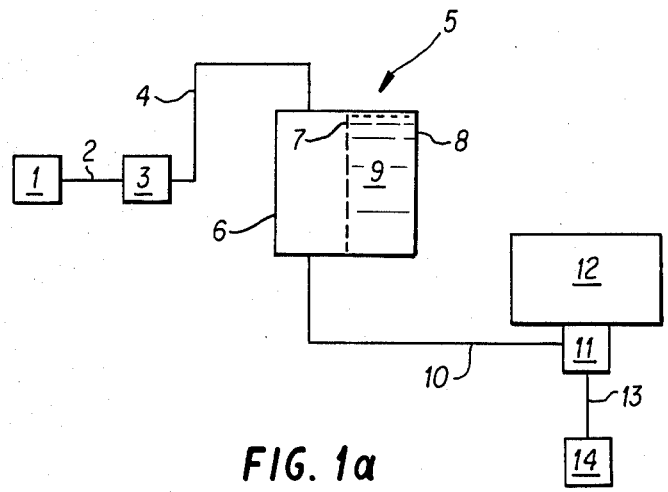
FIG. 1a schematically shows a flow path of liquid through an apparatus of the invention included as part of a larger apparatus which measures the luminescence of an analyte.

The present invention provides a simple and effective alternative to current methods of sample degassing of fluorescent and phosphorescent samples and is applicable to removing oxygen from fluid streams in general. Generally, the method of the invention comprises contacting a fluid, preferably a liquid, from which oxygen is to be removed with one side of an interface capable of passing oxygen and retarding the passage of the fluid. This contacting takes place in a container permeable to oxygen only through the interface. The second side of the interface is in contact with a chemically deoxygenating environment. Oxygen passes through the interface and is removed by chemical reaction, thereby greatly reducing the oxygen concentration on the second side of the interface, a process which greatly increases the rate of diffusion through the interface. One useful aspect of this invention is that the effective removal of oxygen is independent of the beginning oxygen content of the fluid being deoxygenated, unlike some prior art processes. After oxygen has been removed from the fluid, the fluid is conducted from the container through a gas impermeable conduit and is utilized for whatever purpose is desired. For example, an analyte-containing liquid could be conducted to a gas impermeable fluorescence or phosphorescence chamber where the fluorescence or phosphorescence of the material contained in the liquid would be measured.

One key aspect of the present invention is the use of an interface permeable to oxygen which retards the fluid from which oxygen is being removed. The term "interface" is used in this application to include all materials through which this process can occur. Generally, the interface is in a form of a "membrane"; i.e., a thin, pliable layer of natural or synthetic material that is permeable to oxygen. At least two general types of membranes are possible. Membranes in which the passage of a gas takes place by dissolution on the face of the membrane which is situated on the side on which the concentration of oxygen is higher, followed by diffusion of oxygen through the membrane and desorption on the second face of the membrane, are known as "permeable" or "semi-permeable" membranes. Oxygen permeable membranes, both flat and tubular, are well-known. Examples include polytetrafluoroethylene, polysilicone, polypropylene, and polyethylene. These materials are particularly suitable for use with caustic or otherwise chemically reactive chemical deoxygenating reagents. Polyethylene tubing is particularly suitable when oxygen is being removed from an organic solvent since it has a high permeability to oxygen and is compatible with many organic solvents.

In addition to the permeable membranes discussed above, other oxygen passing interfaces, such as porous membranes, are also suitable for the practice of the present invention. A "porous membrane" is one in which a gas passes through the membrane merely by following the path of the pores and not by diffusion through the material of the membrane as in the case of permeable membranes. Typically, a porous membrane has pores with an apparent diameter of about 0.01–3 microns, preferably 0.05–1.5, microns and having a critical surface tension of less than 40 dynes/cm at 20° C. Suitable materials are described in, for example, Blanchard et al, U.S. Pat. No. 3,651,616, which is herein incorporated by reference. Of course it is also possible to use membranes which operate by both mechanisms or to use two membranes, each of which operates by one of these mechanisms, at the same time.

A second essential feature of the method of the present invention is the use of a chemically deoxygenating environment in contact with the second side of the interface. Generally, this environment will comprise a gas, liquid or solution capable of reacting with gaseous oxygen and converting the oxygen by chemical means to an inert product. Electrochemical removal of oxygen by means of an electrode is also encompassed by this invention. Any chemical system capable of maintaining a partial pressure of oxygen of less than $1 \times 10^{-4}$ mm of mercury when maintained at room temperature (25° C.) is preferred for use in the practice of this invention.

Typical chemical systems capable of producing rhe desired deoxygenated environment include the following (comments on preparation and use are given where appropriate):

A. Solutions of chromous ($Cr^{2+}$) ions. A typical solution is made by adding 13.5 g $Cr(ClO_4)_2$ to 100 ml $H_2O$ (about 0.4 M $Cr^{2+}$) after which about 25 ml concentrated HCl is added. $CrCl_2$ and $CrSo_4$ may also be used, but the latter is not as satisfactory. Amalgamated zinc (about 33 g/100 ml solution) is then added. The zinc is prepared by washing for 30 sec with 3 M HCl, amalgamating with $HgCl_2$ for 3 min (10 g $HgCl_2$/100 ml $H_2O$), and washing the amalgamated zinc product thoroughly with distilled water. The resulting solution of chromous ions is dark blue initially and turns light blue to green when it is inactivated after reacting with sufficient oxygen.

B. A mixture of 0.5 g lithium aluminum hydride and 10 g benzopinacolone ($Ph_3CCOPh$) in 50 ml pyridine is useful in applications where water vapor is also not desirable. The solution is effective as long as it remains red.

C. A strongly alkaline aqueous solution of pyrogallol (1,2,3-trihydroxybenzene) is effective in removing oxygen rapidly. However, it is difficult to detect visibly when the solution is no longer active.

D. Fieser's solution is prepared by adding 2 g sodium hydrosulfite ($Na_2S_2O_4$; also known as sodium dithionite) to 100 ml water containing 20 g KOH. The solution is kept warm until a blood-red solution is obtained. The solution is used after cooling. The cool solution is effective until the color turns to brown or brown-red or until a precipirate appears. One disadvantage of this chemically deoxygenating solution is that hydrogen sulfide gas may be produced under some circumstances. However, $H_2S$ may be removed from the fluid stream by many known methods, for example by contacting the fluid stream with a second interface which is permeable to $H_2S$ and which contains a solution of saturated aqueous lead acetate on the second side of the interface.

E. A simplified version of Fieser's solution is a 10% aqueous sodium dithionite solution. However, the solution is unstable and must be used while fresh.

F. Benzophenone ketyl-containing organic solvents are effective for removing oxygen and water vapor from non-aqueous fluids. An organic solvent is predried and any acids present are removed by stirring the warm solvent over NaOH or KOH. The filtered solvent is then refluxed over metallic sodium for at least an hour, after which solid benzophenone is added to give a deep blue-purple color. The ketyl mixture is effective in removing oxygen and water vapor from non-reactive gases until the color fades or turns pale.

G. BTS Catalyst, supplied by BASF Co., 866 Third Avenue, New York, NY 10022, is effective in removing oxygen, as well as $H_2$, $H_2S$, CO, COS and vinyl chloride, from both gases and liquids. The catalyst is supplied in the oxidized state and must be reduced at 120°–200° C. with $H_2$ or CO before it can be used for removing oxygen.

Other methods of oxygen removal also exist and can be used in the practice of this invention. See, for example, The Manipulation of Air-Sensitive Compounds, by D. F. Shriver (McGraw-Hill, New York, 1969), which is herein incorporated by reference. Although many deoxygenating methods are readily adopted to the present invention, some require complicated techniques and are therefore not preferred. For example, a nitrogen or argon stream on the second side of the interface may be passed through copper filings heated at 500°–600° C. The nitrogen (argon) can then be recycled to pick up additional oxygen. Such a technique, however, requires elaborate heating, cooling and circulating devices and loses many of the advantages of simplicity afforded by other means of forming a chemically deoxygenating environment, such as those discussed above in detail. Solutions containing chemical species which react with oxygen, such as those discussed above as well as solutions of sodium sulfite ($Na_2SO_3$), hydrazine and vanadous sulfate, are preferred deoxygenating environments. Although many of these chemically deoxygenating environments had previously been used to remove oxygen from a gas stream bubbled therethrough, there was no indication prior to the present invention that efficient deoxygenation would take place in a liquid or gaseous fluid stream that was separated from the deoxygenating environment by an interface as described herein.

One particularly useful embodiment in the invention employs $Cr^{2+}$ ions to consume the oxygen. Thus, as oxygen diffuses into the deoxygenating environment, the oxygen is immediately consumed and reduced to water in the presence of $Cr^{2+}$ and $H^+$. The net result is that the oxygen concentration on the second side of the interface does not reach a level sufficient to eliminate the concentration gradient that drives difussion toward the second side of the interface. Consequently, oxygen continues to diffuse across the interface until the oxygen content of the fluid is in equilibrium with the oxygen concentration in the deoxygenating environment (i.e., essentially oxygen free).

Although satisfactory deoxygenation can occur in a simple $Cr^{2+}$ solution until the $Cr^{2+}$ ions are consumed, a more preferred embodiment uses a second material to reduce the $Cr^{3+}$ ions, formed by reaction with oxygen, to $Cr^{2+}$ ions. A particularly preferred embodiment uses amalgamated zinc as the reducing agent. The solution containing the $Cr^{2+}$ ions is maintained in contact with amalgamated zinc. The zinc effectively reduces the $Cr^{3+}$ ions to $Cr^{2+}$ ions which can then recombine with oxygen. These two reactions are summarized by the following equations:

$$Zn(Hg) + 2Cr^{3+} \rightarrow Zn^{2+} + 2Cr^{2+} + Hg$$

$$4Cr^{2+} + O_2 + 4H_3O^+ \rightarrow 4Cr^{3+} + 6H_2O$$

Various methods and apparatuses for conducting the deoxygenating process can be used. However, it is essential that the container which maintains the fluid in contact with the interface, as well as the conduit which conducts the fluid from the container to the point of ultimate use, must be oxygen impermeable in order to prevent the diffusion of oxygen back into the fluid after it has been deoxygenated. Typically, the container, conduit, and other non-oxygen-permeable parts of the apparatus walls are constructed of a material, such as glass, metal and non-permeable plastics and polymers, through which oxygen cannot pass from the air.

The shape and construction of the devices used in carrying out this method are not limited other than by the limitations specifically set forth in this application. The combinarion of flow rate, fluid thickness in contact with the interface and contact surface area (the three principal factors which determine the effectiveness of oxygen diffusion out of the fluid being deoxygenated) can easily be selected to accommodate the different effectiveness of the various chemically deoxygenating environments and the amount of oxygen in the fluid being deoxygenated. Slower flow rates, thinner fluid thicknesses and larger surface areas all increase the effectiveness of oxygen diffusion out of the fluid. These factors can be adjusted by simple experimentation by testing the oxygen content of the fluid exiting the contacting chamber. Suitable testing methods include oxygen sensitive electrodes as well as contacting with a small volume of any of the chemical deoxygenating methods discussed above, such as pyrogallate solution, which produces a color change on reacting with oxygen.

In a particularly preferred embodiment of the present invention, the interface through which diffusion occurs is in the form of tubing through which the fluid is conducted. When constructed in this manner, the interface tubing itself forms the first containing means. Tubing is preferred since the fluid stream can readily pass into and out of the tubing from conduits of the same diameter without significant additional mixing, an important factor when analytes carried in a fluid stream, such as in an automated analyzer, are being detected or quantified. The tubing is immersed in a liquid in which the chemically deoxygenating environment is maintained. When a sample to be deoxygenated, such as a liquid containing a fluorescent or phosphorescent material, is conducted into the tubing (first containing means) from a sampling device or other source, oxygen passes through the walls of the tubing into the solution where it reacts with the deoxygenating chemical present in the fluid. The interface tubing then connects with a conduit, also generally a tube, made of a second material which is impervious to oxygen. The deoxygenated fluid is transported through the conduit until it reaches the point at which it is used or analyzed. If the fluid contains a luminescent material for analysis, for example, the fluid is conducted to a gas impermeable luminescence chamber, typically in a fluorescence or phosphorescence spectrophotometer of orherwise standard design.

The method of this invention of removing oxygen from a fluid stream as well as the apparatus for carrying out this method can easily be adapted for use in any of the many processes which would benefit from oxygen removal. For example, many analytical techniques including chromatography and electrochemistry can be benefited by oxygen removal. Manufacture of oxygen sensitive chemicals, such as in the photographic chemicals industry, could be greatly aided by the present invention, since no contact between the fluid being deoxygenated and the deoxygenating chemical itself is necessary. Air sensitive chemicals could be stored for longer periods of time if the oxygen introduced during the manufacturing process from solvents and the like were eliminated using this method.

A particularly preferred embodiment of the present invention involves the removal of oxygen from fluid streams containing analytes, such as in an automated analyzer, which are to be measured by phosphorescence or fluorescence. Existing spectrophtometers can easily be adapted to the practice of the present invention by incorporating a deoxygenating appartus into the conduit that is conducting the fluid being analyzed into the luminescence chamber. No further modifications should be necessary since the luminescent material being measured is not contacted directly with the deoxygenating chemical.

As used herein, a "luminescent" material is one which fluoresces or phosphoresces after its electrons have been raised to a higher electronic state, whether this occurs because of electromagnetic or chemical energy being absorbed by the luminescent material. Typically, electromagnetic energy, usually in the ultraviolet range, is used to generate the excited state. The fluorescence or phosphorescence step is not itself part of the present invention, which is related to deoxygenation of the sample containing the luminescent material prior to the excitation and luminescence events.

The method of the invention can be applied to any method which involves the measurement of luminescence. Examples include direct analysis for the presence of a fluorescent substance and the use of fluorescent molecules to label antibodies which are specific for a particular analyte. Other examples include improved detection in liquid chromatography and electrochemical measurements by deoxygenation. Preferred methods involving the measurement of luminescence which can be used with the present deoxygenating method include measurement of room temperature phosphorescence by micellular enhancement as well as automated fluorescence and phosphorescence measurements.

A more complete understanding of the invention is afforded by reference to the accompanying drawings in connection with the following description. FIG. 1 shows a schematic diagram of an apparatus of the invention and illustrates a method of practicing the invention in tne context of a complete system for analysis of a sample to be deoxygenated. Referring to FIG. 1, sampling container 1 takes in a sample to be analyzed and passes the sample through conducting conduit 2 under the influence of pump 3. Although the pump is shown at a given point in FIG. 1, those skilled in the art will readily recognize that the pump may be used at any point in the fluid stream. Neither conducting conduit 2 which leads from sampling container 1 to pump 3 nor conducting conduit 4 which leads from pump 3 to the deoxygenating apparatus 5 needs to be gas impermeable although gas impermeability for these conducting elements is preferred. Deoxygenating apparatus 5 by itself contains the essential parts of the apparatus of the invention.

In the deoxygenating portion of the apparatus, the sample passes into a first container 6 where it contacts interface 7. In the embodiment shown in FIG. 1b, container 6 and interface 7 are the same and consist of a tubing made of oxygen permeable material, and the pump 3 is a peristaltic pump. Nitrogen is shown being pumped into deoxygenating apparatus 5 in order to exclude air therefrom. However, nitrogen is not required if apparatus 5 is airtight. The container 6 is immersed within the liquid containing area of deoxygenating environment container 8. Container 8 contains deoxygenating environment 9 which in FIG. 1b comprises a solution containing a chemical capable of reacting with oxygen and removing oxygen from solution 9. The continued pumping action of pump 3 forces liquid through container 6, thereby degassing the sample. The sample then passes to conducting conduit 10, which is impermeable to oxygen, and is transported through this conducting conduit to the fluorescent or phosphorescent chamber 11 of a fluorescence or phosphorescence spectrophotometer 12. After the fluorescence or phosphorescence is measured in chamber 11, the sample passes out of spectrophotometer 12 through conducting conduit 13 for disposal or recovery at a disposal or recovery station 14, which is flask 14 in FIG. 1b.

Figure 2:
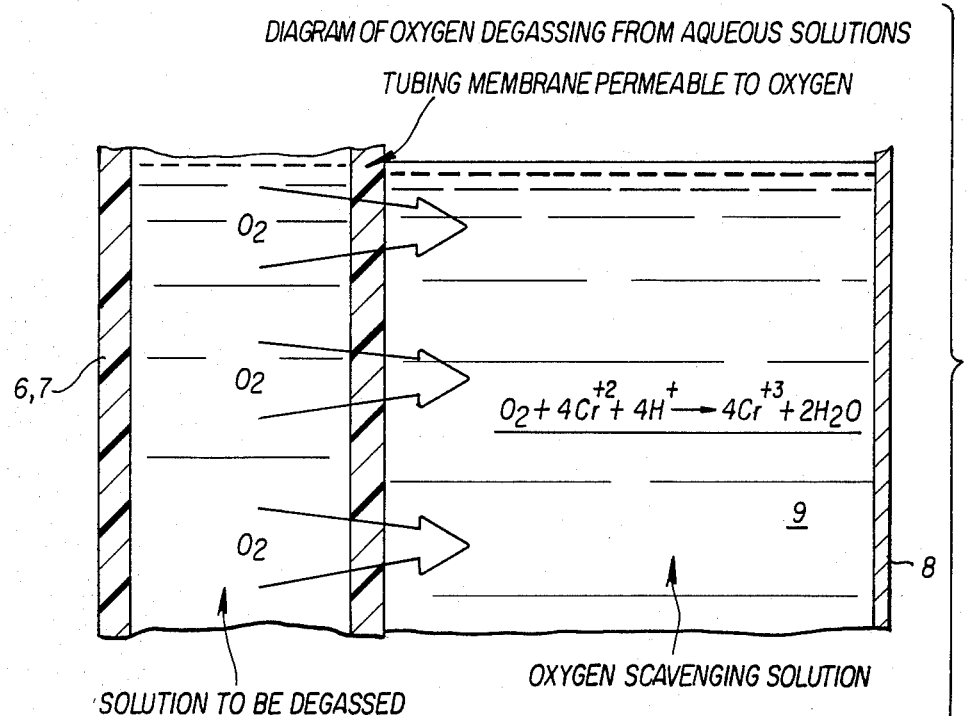
FIG. 2 shows in schematic form the processes which occur at the interface.

FIG. 2 shows an enlarged view of a portion of the deoxygenating apparatus 5 showing only the first container 6 in the form of a tube and deoxygenating solution 9 in order to illustrate the processes occurring at the interface. The fluid being degassed is passed through container/interface 6-7. During this passage, oxygen present in the sample solution migrates through interface 7 by passive diffusion. When the oxygen enters solution 9, it reacts with a deoxygenating chemical present in the solution as illustrated by the reaction with $Cr^{2+}$ and $H^+$ shown in FIG. 2. This reaction prevents oxygen from building up in the deoxygenating solution and thereby prevents the buildup of any partial pressure due to oxygen in the solution on the deoxygenating side of the interface.

Figure 1B:
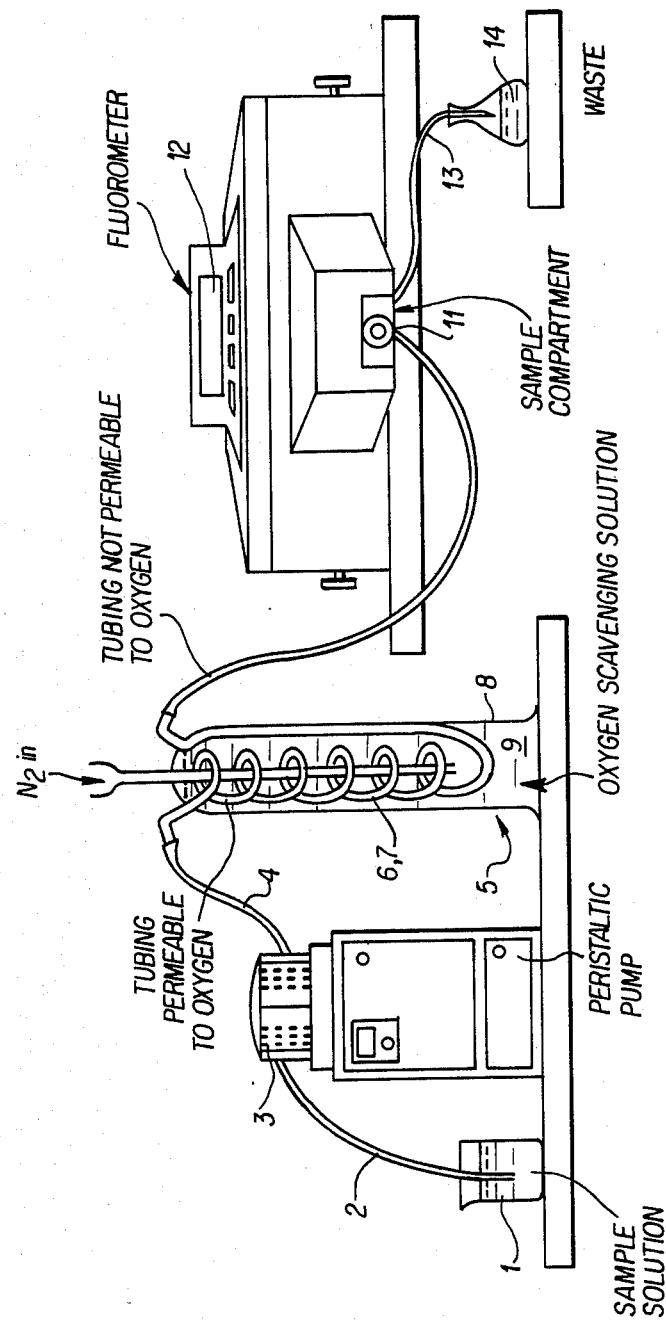

As is clear from the description given above, the shape of the interface is not essential. For example, the interface may consist of tubing which passes through the liquid containing area of liquid container such as is illustrated in FIG. 1b. However, other types of interfaces and containing means are also possible. For example, multiple parallel tubes, such as are commonly found in kidney dialysis machines, may be used in place of the single convulated tubing shown in FIG. 1. It is also possible to use flat membranes, for example, a single flat membrane which divides a chamber into two compartments. The first compartment, which should be relatively thin in order to allow easy diffusion of oxygen out of the sample, contains the sample to be deoxygenated. The second compartment contains the deoxygenating solution. Multiple flat interfaces arranged so that alternating layers of sample and deoxygenating solution flow past each other are also suitable as are any other variations which produce a deoxygenating interface as described herein. For example, any of the vacuum degassing apparatuses shown in the U.S. Patents cited in the section of this application entitled Description of the Prior Art (which are herein incorporated by reference) can be easily adapted to produce an apparatus of this invention, now that the invention has been described, by replacing the vacuum chamber with a chamber containing a deoxygenating environment, such as those described herein.

The invention now being generally described, the same will be better understood by reference to certain specific examples which are included herein for purposes of illustration only and are nor intended to be limiting of the invention or any embodiment thereof, unless specified.

EXAMPLES

A deoxygenating fluorescence spectrophotometer was prepared by coupling a Gilson Minipuls 2 Peristaltic Pump to a Perkin-Elmer LS-5 Fluorescence Spectrophotometer. A solution of the analyte ($1 \times 10^{-7}$ M pyrene for all preliminary analysis) was pumped through oxygen permeable tubing which was immersed in a strongly reducing chromous sulfate/amalgamated zinc solution prepared according to the methods of Bumjarner et al, J. Phys. Chem., 86, 4029–4033 (1982) and Kolthoff and Lingane, "Polarography", Vol. I, 2nd Ed., Interscience, New York, 1952, p. 396, which are herein incorporated by reference. The final deoxygenating solution contained 0.1 M chromous sulfate, 1.5 M $H_2SO_4$ and varying amounts of amalgamated zinc.

Polypropylene tubing (2.76 mm internal diameter, 3.17 mm external diameter) containing $1 \times 10^{-7}$ M pyrene (Chem. Service) in cyclohexane (Burdick and Jackson) was placed in a container of chromous sulfate/amalgamated zinc reducing solution as described above. The container was then placed in an ice bath to retard volatilization of the cyclohexane during the course of the experiment. The emission spectra of the deoxygenated pyrene solutions were compared to the emission spectra of aerated pyrene solutions. Enhancement factors of the deoxygenated pyrene solutions were calculated based on the luminescence intensity of several select peaks (373 nm, 383 nm and 392 nm) of the deoxygenated pyrene solutions relative to the intensity of the same peaks of the aerated pyrene solutions. These experiments are reported as "Static Experiments".

Pyrene ($1 \times 10^{-7}$ Chem. Service) in cyclohexane (Burdick and Jackson) was allowed to equilibrate by shutting off the pump for selected increments of time. The emission spectrum of the analyte from 350 nm to 500 nm, at an excitation wavelength of 336 nm, was scanned at various time intervals during the equilibration period to monitor luminescence enhancement as a function of time. Enhancement factors of the deoxygenated pyrene solutions were calculated as stated previously. These experiments are reported as "Isochronal Experiments".

In order to determine the type of tubing (i.e., oxygen permeable membrane) that had the greatest permeability to oxygen and therefore had the most rapid diffusion rate within the shortest analysis time, five types of tubing were evaluated. The results are shown in Table I.

TABLE I

| Type of Tubing | Length (feet) | ID/OD (mm) | Equilibration Time | Enhancement Factor |
| --- | --- | --- | --- | --- |
| Teflon | 12 | 0.81/1.62 | None | 1.92 |
| | | | 2 Hours | 3.08 |
| | | | 4 Hours | 3.70 |
| Tygon | 10 | 1.02/1.78 | 1 Hour | 1.59 |
| | | | 2 Hours | 1.25 |
| | | | 3 Hours | 1.52 |
| Silicon | 10 | 1.59/3.18 | 3 Hours | 1.32 |
| Polypropylene | 10 | 2.76/3.17 | None | 8.68 |

TABLE I-continued

| Type of Tubing | Length (feet) | ID/OD (mm) | Equilibration Time | Enhancement Factor |
| --- | --- | --- | --- | --- |
| | | | 15 Minutes | 8.17 |
| | | | 1 Hour | 2.21 |
| Polyethylene | 10 | 1.57/2.08 | None | 3.34 |
| | | | 15 Minutes | 6.74 |
| | | | 30 Minutes | 10.41 |
| | | | 45 Minutes | 12.60 |
| | | | 1 Hour | 13.40 |

In these experiments, polyethylene tubing had the most rapid oxygen diffusion rate within the shortest equilibration time of the types of tubing tested and was therefore used in subsequent experiments. The silicone tubing tested here expanded considerably in the presence of cyclohexane, which may be the cause of the deviation from the manufacturers' data regarding oxygen permeability, which indicated that the silicone tube should have had the highest oxygen permeability. The relative oxygen permeabilities of the various types of tubing as listed by the manufacturers were as follows: Teflon, 3.4; Tygon, 1.0; silicone, 30.0; polypropylene, ~1.7; and polyethylene, ~3.4.

Figure 3:
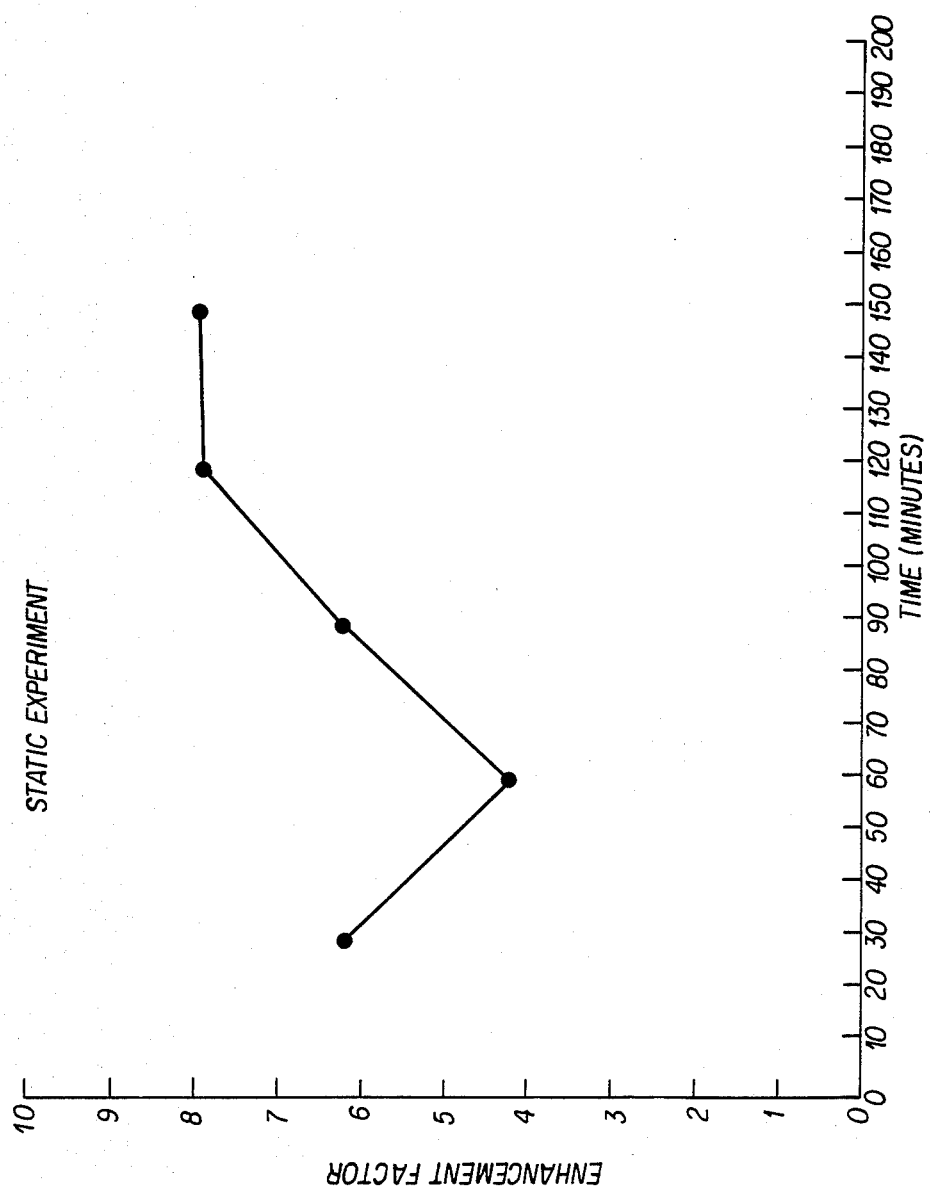
FIG. 3 shows a plot of enhancement factor versus degassing time in a static experiment.

A set of static experiments was initially conducted in order to evaluate the feasibility of the approach. The static experiments eliminated many of the variables that are encountered in the isochronal experiment (i.e., flowrate, tubing length, tubing diameter, etc.) The static experiments tested the validity of the underlying principles of the deoxygenation procedure (i.e., they determined that removal of oxygen by chemical generation of a concentration gradient was a plausible alternative to current methods of sample degassing). The graphical representation of the effect of equilibration time on enhancement factor for the static experiments is shown in FIG. 3. The decrease in fluorescence observed for the second point in this curve has been observed in several repeated experiments. The cause of this decrease has not been definitively determined. However, one possible explanation is that quenching impurities may initially be leached from the tubing into the cyclohexane solution of the fluorophore. This would cause an initial decrease in fluorescence intensity. When the impurities reach an equilibrium concentration, the fluorescence would no longer decrease but would begin to increase as a result of oxygen diffusing through the tubing and being scavenged by the chromous solution. However, the inventors propose this explanation only as theory and do not intend their invention to be limited thereby.

In spite of the initial irregularity in the static curve, the overall objective of the static experiments was attained since the results showed conclusively that diffusion through an oxygen permeable membrane in conjuction with consumption of the oxygen by a scavenging solution is a simple and effective approach to sample degassing. It is evident from the enhancement factors that diffusion of oxygen from the analyte solution has indeed taken place. Therefore, removal of oxygen from luminescent solutions via chemical generation of a concentration gradient offers a simple and effective deoxygenation procedures.

Figure 4:
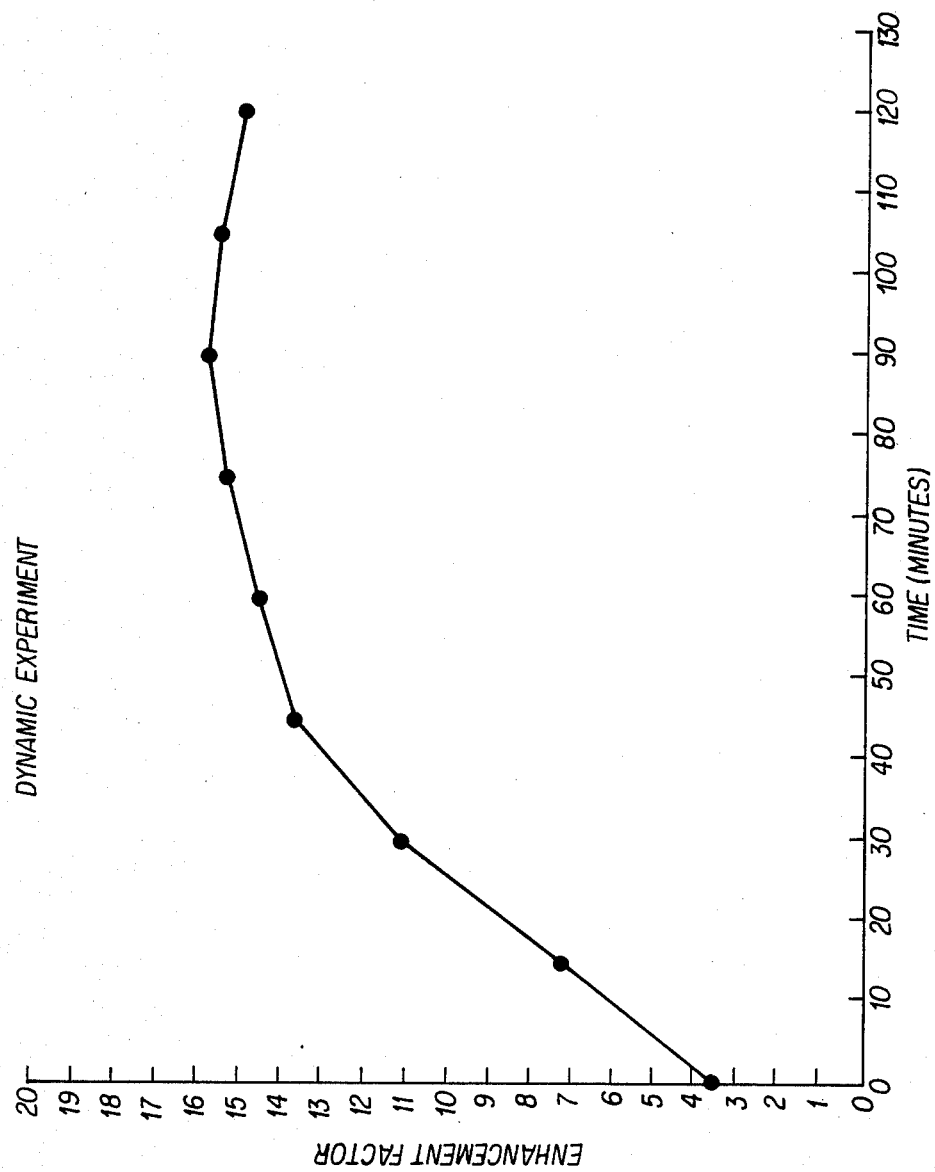
FIG. 4 shows a plot of enhancement factor versus degassing time in an isochronal experiment.

FIG. 4 illustrates the effect of equilibration time on enhancement factor for the isochronal experiments. The greatest luminescence enhancement appears to occur at ninety minutes equilibration time.

The invention now being fully described, it will be apparent to one of ordinary skill in the art that many changes and modifications can be made thereto without departing from the spirit or scope of the invention as set forth herein.

What is claimed as new and desired to be secured by Letters Patent of the United States is:

1. A method for decreasing the oxygen content of a fluid stream which comprises:
contacting said fluid with one side of a membrane capable of passing oxygen and retarding the passage of said fluid wherein said contacting takes place in a container permeable to oxygen only through said membrane and the second side of said membrane is in contact with a chemically deoxygenating environments.

2. The method of claim 1, wherein said membrane is a porous membrane.

3. The method of claim 1, wherein said membrane is a semipermeable membrane.

4. The method of claim 1, wherein said chemically deoxygenating environment is a solution.

5. The method of claim 4, wherein said container is in the form of a tube surrounded by said solution.

6. The method of claim 5, wherein said tube is a semipermeable membrane.

7. The method of claim 5, wherein said solution contains $Cr^{2+}$ ions and is in contact with amalgamated zinc.

8. The method of claim 5, wherein said tubing is polytetrafluoroethylene, polysilicone, polypropylene, or polyethylene tubing.

9. The method of claim 8, wherein said tubing is polyethylene tubing.

10. The method of claim 9, wherein said solution contains $Cr^{2+}$ ions and is in contact with amalgamated zinc.

11. A method for decreasing the oxygen content of a fluid stream, which comprises:
contacting said fluid with one side of a membrane capable of passing oxygen and retarding the passage of said fluid wherein said contacting takes place in a container permeable to oxygen only through said membrane and the second side of said membrane is in contact with a chemically deoxgenating environment selected from the group consisting of solutions of chromus ions, mixtures of lithium aluminum hydride and benzopinacolone in pyridine, alkaline aqueous solutions of pyrogallol, Fieser's solution, aqueous sodium dithionite solutions, benzophenone ketyl-containing organic solvents, reduced BTS catalyst, solutions of sodium sulfite, solutions of hydrazine, and solutions of vanadous sulfate.

12. A method for decreasing the oxygen content of a fluid stream, which comprises:
contacting said fluid with one side of a membrane capable of passing oxygen and retarding the passage of said fluid wherein said contacting takes place in a container permeable to oxygen only through said membrane and the second side of said membrane is in contact with a solution containing $Cr^{2+}$ ions in contact with amalgamated zinc.

13. An apparatus for deoxygenating a fluid stream, which comprises:
a membrane capable of passing oxygen and retarding the passage of said fluid;
first containing means for maintaining said fluid in contact with one side of said membrane, said first containing means being impermeable to oxygen except through said membrane and having inlet and outlet means through which said fluid is conducted into and out of said first containing means; and
second containing means for maintaining a chemically deoxygenating environment in contact with a second side of said membrane wherein said liquid containing means contains a chemically deoxygenating environment selected from the group consisting of solutions of chromus ions, mixtures of lithium aluminum hydride and benzopinacolone in pyridine, alkaline aqueous solutions of pyrogallol, Fieser's solutions, aqueous sodium dithionite solutions, benzophenone ketyl-containing organic solvents, reduced BTS catalyst, solutions of sodium sulfite, solutions of hydrazine, and solutions of vanadous sulfate.

14. The apparatus of claim 13, wherein said membrane is a porous membrane.

15. The apparatus of claim 13, wherein said membrane is a semipermeable membrane.

16. The apparatus of claim 15, wherein said membrane is in the form of a tube arranged to conduct said fluid through said second containing means.

17. The apparatus of claim 16, wherein said tube is formed from a material selected from the group consisting of polytetrafluoroethylene, polysilicone, polypropylene, and polyethylene.

18. The apparatus of claim 17, wherein said tube is formed of polyethylene tubing.

19. The apparatus of claim 18, wherein said first containing means consists of said tube.

20. The apparatus of claim 13, wherein said second containing means comprises liquid containing means.

21. The apparatus of claim 20, wherein said first containing means is a tube located within a liquid containing area of said liquid containing means.

22. The apparatus of claim 21, wherein said tube includes a section of semipermeable membrane tubing.

23. The apparatus of claim 22, wherein said tubing is polyethylene tubing.

* * * * *

UNITED STATES PATENT AND TRADEMARK OFFICE
CERTIFICATE OF CORRECTION

PATENT NO. : 4,516,984

DATED : May 14, 1985

INVENTOR(S) : ISIAH M. WARNER ET AL

It is certified that error appears in the above-identified patent and that said Letters Patent is hereby corrected as shown below:

Col. 2, line 25, delete "deoxygenarion" and insert --deoxygenation--.

Col. 3, line 19, delete "preferaby" and insert --preferably--.

Col. 3, line 48, delete "rwo" and insert --two--.

Col. 3, line 60, delete "orherwise" and insert --otherwise--.

Col. 4, line 58, delete "precipirate" and insert --precipitate--.

Col. 5, line 54, delete "difussion" and insert --diffusion--.

Col. 6, line 23, delete "combinarion" and insert --combination--.

Col. 6, line 68, delete "orherwise" and insert --otherwise--.

Col. 7, line 20, delete "spectrophtometers" and insert --spectrophotometers--.

UNITED STATES PATENT AND TRADEMARK OFFICE
CERTIFICATE OF CORRECTION

PATENT NO. : 4,516,984

DATED : May 14, 1985

INVENTOR(S) : ISIAH M. WARNER ET AL

It is certified that error appears in the above-identified patent and that said Letters Patent is hereby corrected as shown below:

Col. 7, line 47, delete "Iuminescence" and insert --luminescence--.

Col. 7, line 57, delete "tne" and insert --the--.

Col. 9, line 7, delete "nor" and insert --not--.

Col. 10, line 64, delete "procedures" and insert --procedure--.

Col. 11, line 16, delete "environments" and insert --environment--.

Signed and Sealed this

Eighth Day of October 1985

[SEAL]

Attest:

DONALD J. QUIGG

Attesting Officer

Commissioner of Patents and Trademarks—Designate